United States Patent
Kothari et al.

(10) Patent No.: US 11,057,273 B2
(45) Date of Patent: Jul. 6, 2021

(54) DECENTRALIZED AUTO-SCALING OF NETWORK ARCHITECTURES

(71) Applicant: VERIZON MEDIA INC., New York, NY (US)

(72) Inventors: Abhishek Kothari, San Jose, CA (US); Matti Oikarinen, San Jose, CA (US); Yucheng Xiong, Cupertino, CA (US); Manika Mittal, Sunnyvale, CA (US); Rohit Vijayakumar Athanikar, Sunnyvale, CA (US); Suresh Kumar Thiruvallur Loganathan, Sunnyvale, CA (US); Saravanan Murugesan, Sunnyvale, CA (US)

(73) Assignee: VERIZON MEDIA INC., New York, NY (US)

( * ) Notice: Subject to any disclaimer, the term of this patent is extended or adjusted under 35 U.S.C. 154(b) by 48 days.

(21) Appl. No.: 16/109,061

(22) Filed: Aug. 22, 2018

(65) Prior Publication Data

US 2020/0067778 A1    Feb. 27, 2020

(51) Int. Cl.
*H04L 12/24*    (2006.01)
*G06F 9/50*    (2006.01)
*G06F 9/455*    (2018.01)

(52) U.S. Cl.
CPC ...... *H04L 41/0893* (2013.01); *G06F 9/45558* (2013.01); *G06F 9/5072* (2013.01); *G06F 9/5077* (2013.01); *H04L 41/0806* (2013.01); *H04L 41/30* (2013.01); *G06F 2009/45562* (2013.01)

(58) Field of Classification Search
CPC . H04L 41/0893; H04L 41/0806; H04L 41/30; G06F 9/45558; G06F 9/5072; G06F 9/5077
See application file for complete search history.

(56) References Cited

U.S. PATENT DOCUMENTS

| | | | |
|---|---|---|---|
| 10,409,642 B1* | 9/2019 | Tang | G06F 9/5061 |
| 2015/0378765 A1* | 12/2015 | Singh | G06F 9/50 718/1 |
| 2016/0162320 A1* | 6/2016 | Singh | G06F 9/45558 718/1 |
| 2016/0323377 A1* | 11/2016 | Einkauf | H04L 67/1031 |
| 2017/0257432 A1* | 9/2017 | Fu | H04L 67/2823 |
| 2018/0020077 A1* | 1/2018 | Folco | G06F 16/185 |
| 2018/0285166 A1* | 10/2018 | Roy | G06F 12/08 |

\* cited by examiner

*Primary Examiner* — Christopher B Robinson
(74) *Attorney, Agent, or Firm* — James J. DeCarlo; Greenberg Traurig, LLP

(57) ABSTRACT

Disclosed herein are systems, devices, and methods for providing auto-scaling in a cluster of device instances. In one embodiment, a method is disclosed comprising updating, using a distributed counter, a metric associated with one or more instances executing a network application; identifying that the metric has exceeded a threshold defined in a scaling policy based on comparing the distributed counter to the scaling policy; identifying a command to execute in response to the metric exceeding the threshold; and executing the command to modify the one or more instances.

20 Claims, 6 Drawing Sheets

DECENTRALIZED AUTO-SCALING OF NETWORK ARCHITECTURES

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments are directed to network systems and, particularly, to systems, methods, and apparatuses for auto-scaling network entities such as virtual servers.

Medium- and large-scale network applications often require multiple copies of a single resource. For example, a web-based application can require multiple application servers executing a web server with custom software generating the web pages and providing back-end functionality for the application. Early systems required the manual provisioning of servers and the installation and configuration of such servers with the application software. Since the introduction of virtualization, the provisioning of physical hardware servers has often been replaced with the provisioning of virtual servers on a set of hardware servers. With virtualization, a virtualized application server (or other entity) can be provisioned entirely automatically and using only software. Further, the provisioning can be performed on-demand and is only limited by the underlying physical hardware capacity.

An architecture used by high traffic systems is auto-scaling. In an auto-scaled architecture, one or more instances of an entity (e.g., a web server, a storage device, a router, etc.) are configured. A centralized monitoring system monitors requests to a set of launched instances (e.g., a cluster) to determine if the number of instances can satisfy the demands placed on the cluster. If the demand is too high, the centralized monitoring system launches a new instance. Similarly, the centralized monitoring system can destroy an instance if the cluster is too large.

While such centralized systems are common in large-scale architectures (e.g., AWS by Amazon, Inc. of Seattle, Wash. or Azure by Microsoft, Inc. of Redmond, Wash.), they suffer from numerous deficiencies that negatively impact the performance of the underlying architecture.

First, existing architectures' reliance on a centralized monitoring system introduces significant delays in the auto-scaling strategy. Specifically, the network bandwidth between the centralized monitoring system and the individual instances introduces a delay between when the instance request bandwidth exceeds (or falls below) a threshold and when the centralized monitoring system begins to instantiate new instances. In high performance or large-scale systems, this delay can result in the centralized monitoring system lagging behind the actual demand and result in auto-scaling that is not performed in time to meet the demands of the instances.

Second, the use of centralized monitoring systems reduces the scalability of a distributed architecture. For instance, since the monitoring system is centralized, only a single device is used to perform monitoring functions. Thus, a centralized monitoring system is not horizontally scalable and can only be scaled by increasing the processing or storage power of the centralized monitoring system until it reaches a physical limit.

Third, centralized monitoring introduces more complexity into an overall system. Specifically, additional logic, software, and hardware are required to implement the centralized monitoring system. All of this logic, software, and hardware incurs additional maintenance and increases the opportunities for bugs, intrusion, and other unwanted side effects.

Thus, there exists a need in the state of the art to improve upon auto-scaling architectures which currently rely on centralized monitoring systems.

SUMMARY

To remedy the above deficiencies, the disclosed embodiments describe systems, methods, and devices for auto-scaling network devices without utilizing a centralized monitoring system. The disclosed embodiments solve the above problems and other problems by removing centralized monitoring of instance metrics and using a distributed to monitor such metrics. The disclosed embodiments further provide techniques for responding to alarms raised by using the distributed counter that eliminates the need for, and complexity of, centralized monitoring systems and, in some embodiments, scaling components. In the illustrated embodiments, auto-scaling operations are moved to a cluster of instances and thus removes the need for third-party monitoring hardware and software. Thus, the disclosed embodiments can be implemented on any platform that provides the ability to automatically instantiate, modify, or destroy instances.

In one embodiment, a method is disclosed comprising updating, using a distributed counter, a metric associated with one or more instances executing a network application; identifying that the metric has exceeded a threshold defined within a scaling policy based on comparing the distributed counter to the scaling policy; identifying a command to execute in response to the metric exceeding the threshold; and executing the command to modify the one or more instances.

In another embodiment, a system is disclosed comprising one or more instances executing a network application, the one or more instances configured to update, using a distributed counter, a metric associated with the one or more instances; and a scaling component configured to: identify that the metric has exceeded a threshold defined within a scaling policy based on comparing the distributed counter to the scaling policy, identify a command to execute in response to the metric exceeding the threshold, and execute the command to modify the one or more instances.

In another embodiment, a device is disclosed comprising a processor; a memory storing a scaling policy and a master enabled flag; and a storage medium for tangibly storing thereon program logic for execution by the processor, the stored program logic comprising: logic, executed by the processor, for updating, using a distributed counter, a metric associated with one or more instances executing a network application, logic, executed by the processor, for identifying that the metric has exceeded a threshold defined within the scaling policy, logic, executed by the processor, for identifying a command to execute in response to the metric exceeding the threshold, and logic, executed by the processor, for executing the command to modify the one or more instances.

BRIEF DESCRIPTION OF THE DRAWINGS

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Subject matter will now be described with reference to the accompanying drawings which show illustrative embodiments. Subject matter can, however, be embodied in a variety of different forms and the claimed subject matter is intended to be construed as not being limited to any example embodiments. Likewise, a reasonably broad scope for claimed or covered subject matter is intended. Among other things, subject matter can be embodied as methods, devices, components, or systems. Accordingly, embodiments can, for example, take the form of hardware, software, firmware or any combination thereof (other than software per se).

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to: a processor of a general purpose computer to alter its base functions as detailed herein; a special purpose computer; ASIC or other programmable data processing apparatus, such that the instructions when executed implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

In general, terminology can be understood at least in part from usage in context. For example, terms, such as "and", "or", or "and/or," as used herein can include a variety of meanings that can depend at least in part upon the context in which such terms are used. Typically, "or," if used to associate a list, such as A, B or C, is intended to mean A, B, and C, here used in the inclusive sense, as well as A, B or C, here used in the exclusive sense. Also, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. Also, the term "based on" can be understood as not necessarily intended to convey an exclusive set of factors and can, instead, allow for the existence of additional factors not necessarily expressly described, again, depending at least in part on context.

Figure 1:
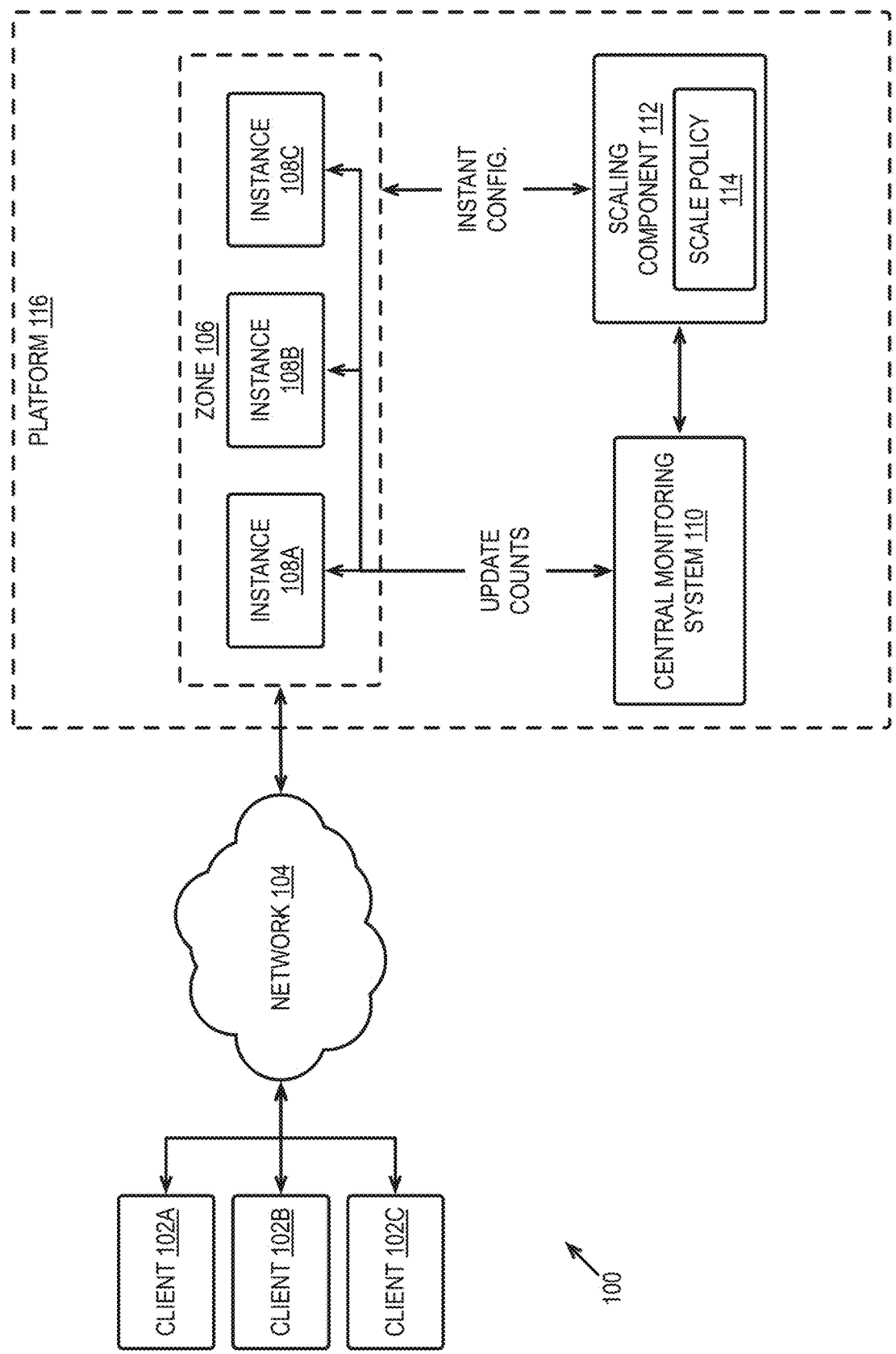
FIG. 1 is a block diagram illustrating a network system providing auto-scaling according to one embodiment.

FIG. 1 is a block diagram illustrating a network system providing auto-scaling according to one embodiment.

In the illustrated embodiment, one or more client devices (102A, 102B, 102C) issue requests and receive responses from the platform (116) via a network (104). In one embodiment, the client devices (102A, 102B, 102C) comprise any computing device capable of interacting over a network such as a laptop, desktop, server, mobile, or another computing device. Client devices (102A, 102B, 102C) can comprise a device such as that depicted in FIG. 6, the disclosure of which is incorporated herein by reference in its entirety. The disclosure places no limit on the operation of client devices (102A, 102B, 102C). In some embodiments, client devices (102A, 102B, 102C) can comprise personal computer devices and the devices can issue requests in response to client commands (e.g., requesting a web page via a web browser). In other embodiments, personal devices used as client devices (102A, 102B, 102C) can issue requests automatically (e.g., as part of background processes). In other embodiments, client devices (102A, 102B, 102C) can comprise non-personal computing devices. For example, client devices (102A, 102B, 102C) can comprise application servers or other devices that issue requests according to pre-programmed functionality.

Network (104) comprises any network capable of connecting computing devices and no limitation is placed on the network. In one embodiment, network (104) comprises the Internet or another wide area network. Network (104) can comprise one or more sub-networks and can include networks of varying protocols, topologies, or other configurations. In general, network (104) comprises any network that enables clients (102A, 102B, 102C) to connect to platform (116).

Platform (116), which is described in more detail herein, comprises a network platform. In one embodiment, the platform (116) comprises a cloud computing platform. As used herein, a cloud computing platform refers to a network-accessible computer, or more commonly a set of computers, that provides network services to client devices. One example of a cloud computing platform is an infrastructure-as-a-service (IaaS) platform. In an IaaS system, the platform provides programmatic access to computing resources such as virtual machines, databases, load balancers, and generally any network devices or software. Popular examples of IaaS platforms include Amazon Web Services ("AWS") by Amazon, Inc. of Seattle, Wash., Azure by Microsoft, Inc. of Redmond, Wash., and Google Cloud Platform by Google Inc. of Mountain View, Calif. IaaS platforms generally provide a graphical and programmatic interface for describing, creating, and maintaining network infrastructure. Thus, instead of a client physically maintaining servers, the same client can issue commands to the IaaS to create, monitor, maintain and perform other operations on a virtualized server. Generally, IaaS platforms rely on virtualization to provide services. This is because only virtualized hardware can be programmatically created and modified. Details of virtualization are described elsewhere in the disclosure and are not repeated herein for clarity. In addition to an IaaS platform, platform (116) can comprise other types of platforms such as a platform-as-a-service (PaaS) platform, software-as-a-service (SaaS) platform, or another type of platform.

The platform (116) illustrated in FIG. 1 illustrates, as an example, a single architecture. As used herein, an architecture generally refers to the combination of network computing devices managed by the platform (116). In general, an architecture (also referred to colloquially as a solution, application, etc.) is managed by an organization to provide a service. In the illustrated embodiment, the architecture includes a zone (106). A zone refers to a collection of instances, instances refer to instantiated entities, and an entity comprises a network device.

As described above, platform (116) provides virtualized network devices such as virtual servers, databases, email relay, desktop-as-a-service, and many other types of devices and services. These network devices are generally represented as "images" which describe the configuration of the network device, similar to a class which describes "blueprint" of an instance of the class in object-oriented programming (OOP) languages. A platform (116) can store many images for many types of devices. For example, one image can describe a Linux-based server with 128 GB of random-access memory (RAM), while another can describe a MySQL database with two terabytes (TB) of underlying storage, while yet another can describe a solid-state drive (SSD) with a network interface. In some embodiments, the instances can refer to other instances. Thus, the previous MySQL database can declare a dependency on the SSD instance.

In one embodiment, a client can instantiate one or more images via a command line application, graphic user interface (GUI), or programmatically via one or more application programming interface (API) calls. For example, a user launching a website can issue a command to instantiate a virtual server that provides a web server. In other embodiments, instances can be instantiated by the platform (116) itself. In one particular embodiment, the platform (116) instantiates instances (108A-108C) automatically in response to conditions recorded for the instances (108A-108C) or the zone (106) as a whole.

As illustrated, a platform (116) includes a central monitoring system ("CMS") (110). In one embodiment, the CMS (110) can comprise an instantiated network device itself. Although, in other embodiments, the CMS (110) is a stand-alone application executed by the platform (116). In one embodiment, instances (108A-108C) or zone (106) transmit alerts or alarms to CMS (110) periodically during their lifespan. For example, each instance (108A-108C) can periodically transmit the number of network requests it has handled since the last alert (e.g., during a pre-defined reporting interval). In some embodiments, the zone (106) can aggregate and report alerts from the various instances. As another example, central processing unit (CPU) usage of the instances (108A-108C) can be reported during a standard interval.

CMS (110) can be used for a variety of functions beyond scaling. For example, CMS (110) can be used to provide alerts to the operator of the instances that a certain amount of RAM is being used or that the amount of network input/output (I/O) is exceeding a usage tier (thus incurring costs). Thus, CMS (110) is not limited to performing autoscaling, but as will be discussed can be leveraged to utilize autoscaling.

In some embodiments, CMS (110) acts as a clearinghouse of alerts: it receives alerts from zone (106) or instances (108A-108C) and provides those alerts to any registered service (e.g., using a notification server or message queue). As illustrated, one of these services can comprise a scaling component (112). In the illustrated embodiment, scaling component (112) is responsible for creating and destroying instances in the zone (106). Scaling component (112) is configured with a scaling policy (114) that defines when instances should be created, modified, or destroyed and how those instances should be created, modified, or destroyed. For instance, a scaling policy can define that no instance (108A-108C) should operate above 75% CPU utilization and, if at least two devices are operating above 75% CPU utilization, a new instance should be instantiated. If the scaling component (112) detects that an alarm was raised with the CMS (110), the scaling component (112) programmatically issues commands to instantiate another instance, or destroy an instance, as necessary.

A short example of the above components is provided herein. In one example, the scaling policy (114) dictates that no instance should use more than 50% of available RAM, the RAM being defined within an image corresponding to the deployed instances (108A-108C), and if even a single instance exceeds this threshold a new instance should be created. During operation, instance (108A) can detect RAM usage at 75% and generate a corresponding alert which it transmits to CMS (110). In other embodiments, CMS (110) can proactively poll the instances (108A-108C) to request metrics (e.g., RAM usage) of interest. CMS (110) then provides the alert to any other components such as scaling component (112). Scaling component (112) analyzes the scaling policy (114) and determines that the given alert triggers a rule in the scaling policy. In response, scaling component (112) issues commands to the platform (116) to instantiate a new instance according to the triggered rule.

Figure 2:
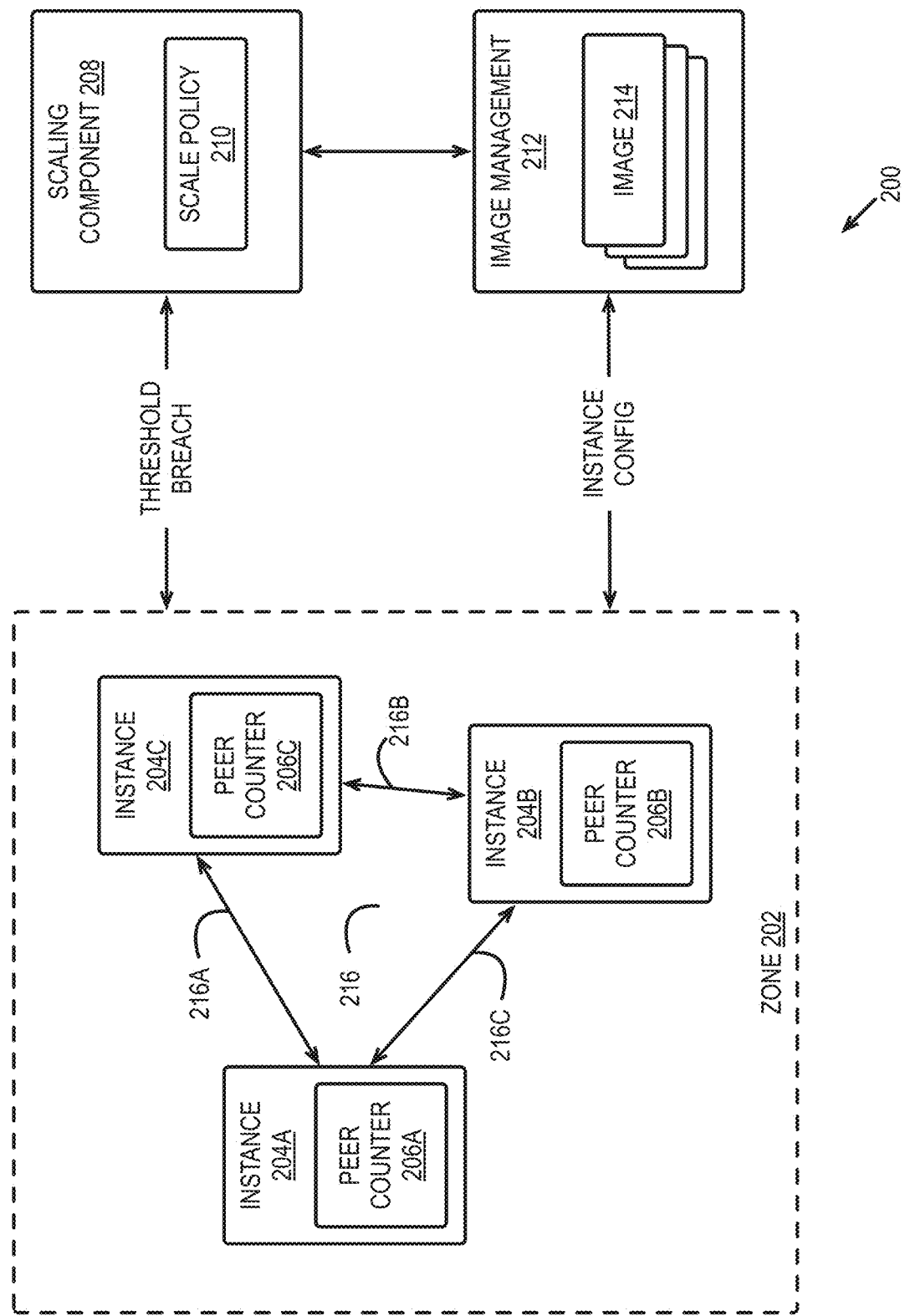
FIG. 2 is a block diagram illustrating a network platform providing decentralized auto-scaling according to some embodiments.

FIG. 2 is a block diagram illustrating a network platform providing decentralized auto-scaling according to some embodiments.

For ease of description, FIG. 2 illustrates a platform for providing network services and does not illustrate external devices such as network (104) and client devices (102A-102C). Certainly, in some embodiments, platform (200) receives requests from client devices via a network in the manner discussed in connection with FIG. 1, the description of which is incorporated by reference in its entirety.

The illustrated platform (200) includes an exemplary zone (202). Zone (202) can include the same characteristics are those of zone (106) discussed in connection with FIG. 1, the disclosure of which is incorporated herein by reference in their entirety. In the illustrated embodiment, zone (202) includes an internal network (216), represented by bi-directional links (216A-216C). In one embodiment, this network (216) can comprise a virtual private network connecting each of the instances (204A-204C). In some embodiments, the network (216) enables communication between the instances (204A-204C) while ensuring external connections are disallowed.

Instances (204A-204C) includes the characteristics and functionality of instances (108A-108C) and those details are not repeated herein but are incorporated by reference in their entirety. Generally, instances (204A-204C) comprise instantiated network devices from pre-stored images. Instances (204A-204C) differ from instances (108A-108C) in that they include peer counters (206A-206C). Operation of the peer counters (206A-206C) are discussed in more detail herein, however a general overview of the peer counters (206A-206C) is provided here.

In one embodiment, peer counters (206A-206C) comprise a counter (i.e., a dedicated portion of RAM configured to record a count) as well as a local distributed counter application. In one embodiment, peer counters (206A-206C) can be implemented as an operating system service for a virtual machine (e.g., as a daemon process). Since a portion of peer counters (206A-206C) is implemented as software, it can be included as a part of the image used to create the instances (204A-204C). In some embodiments, the peer counters (206A-206C) can be distributed as a package (e.g., a Linux package such as an rpm package). In this manner, the package identifier can be recorded as part of an installation script of the instance image, downloaded during instantiation, and installed prior to launching an instance, allowing the peer counters (206A-206C) to be included for any type of instance (e.g., a virtual machine, database, etc.). In this manner, the instances themselves control whether or not to implement the peer counter functionality. When the instances themselves control the functionality, reliance on backend services (e.g., central monitoring systems) is removed and system developers can include the peer counters (206A-206C) and other features to be described on any platform providing cloud computing services.

As briefly discussed peer counters (206A-206C) count events or other countable items. Generally, the peer counters (206A-206C) are used to record events that can give rise to an auto-scaling need. Examples of such events include CPU utilization, RAM utilization, network I/O utilization, the number of network requests, the number of network responses, the status code of responses, average latencies of the slowest n requests, running time, number of threads used (load), or time in states (e.g., states comprising user mode, system mode, idle mode), wait mode, etc.). In some embodiments, the peer counters (206A-206C) also utilize a time period for tracking above events. For example, the peer counters (206A-206C) can monitor a specific metric over a given interval. As one example, the metric can comprise the number of inbound network requests during a 5-minute period. At t=0, the peer counter is initialized to either zero. Between t=0 and t=5 min, the peer counters (206A-206C) accumulate the counter for each inbound network request and at t=5 min., updates the counter value to the number of inbound requests for the last five-minute period.

The peer counters (206A-206C) additionally distribute their local counts to other instances as indicated by the network paths (216A-216C). A detailed discussion of a distributed counter architecture is provided in co-owned U.S. Ser. No. 15/483,320. In general, the peer counters (206A-206C) broadcast their counts to other instances (204A-204C) in the zone (202).

According to some embodiments, the instances receive requests from clients that cause an update to peer counter (e.g., 206A). For example, any inbound network request from a client would update a count of inbound network requests. As another example, a network request causing the CPU to perform an action would update a peer counter monitoring CPU usage.

As described above, the instance can be configured to provide a service to a number of clients. A number of peer counters (206A-206C) can be updated, such that each counter's count (or count value) is updated (e.g., incremented, decremented, decayed, boosted, set or reset to a certain value, etc.). The peer counters (206A-206C) can be updated in response to a request (or call) by a client. A message is communicated, by the instance, to a number of other instances (or peers) with which the instance shares a distributed count value, each one of the number of the peers is capable of maintaining its own peer counters corresponding to the client locally. The message comprises a command instructing each one of the number of peers to which the message is directed to update (e.g., increment, decrement, decay, boost, set (reset) to a certain value, etc.) its peer counter (206A-206C) identified in the message.

The disclosed embodiments can use the distributed count value maintained using the peer counters (206A-206C) to determine whether or not to modify the number of instances (as will be discussed in more detail). The determination can be made using a peer counter's counter value whose update includes applying a decay (or gain). By way of some non-limiting examples, the decay (or gain) can be based on an exponential decay over time or call count, linear decay (gain) over time or call count, explicit reset periodically, sliding window, sigmoid, or the like. A peer counter can have an associated upper limit (or threshold) value, such that if the count value of the peer counter reaches the upper limit it is not incremented further. Rather than incrementing the count value of a peer counter, the count value can be decremented (or incremented) with or without applying a gain (or decay) function to the count value. Such an inverse functionality can be used for token-based throttling, e.g., decrease token count per client. An instruction recipient (e.g., a peer) can further decay and/or boost the received count based on its state.

The disclosed embodiments can send the message, with an instruction to update the peer counters (206A-206C), to all of the peers sharing a distributed count value. Alternatively, the message can be sent to a subset of the peers. In the latter case, the message can include an instruction to increment the counter by an amount dependent on the number of peers included in the subset and the total number of peers sharing the distributed count value. By way of a non-limiting example, in a case that there are 1000 instances sharing a distributed count value and the message is to be sent to ten percent (or 100 peers) of the 1000 peers, the message can be communicated to the 100 peers with an instruction to each peer to increment its own peer counters (206A-206C) by 10. By way of some non-limiting examples, the peers included in the peer subset can be selected randomly (e.g., any random, random unique set, random continuous range, etc.), round robin, or the like. Peers sharing level of activity information can be pre-defined, automatically discovered (e.g., gossiping), or the like. Communication between peers can be multicasting, broadcasting, or the like.

Scaling component (208) is communicatively coupled to the zone (202) and the instances (204A-204C). Scaling component (208) includes a scaling policy (210) which governs how instances are created and destroyed in response to monitored metrics (e.g., the number network requests). Scaling component (208) and scaling policy (210) perform similar operations as described with respect to the scaling component (112) and scaling policy (114) in FIG. 1 and the details of those devices are incorporated herein by reference in their entirety.

In FIG. 2, however, a central monitoring system is omitted from the platform (200). Thus, the scaling component (208) does not receive alarms via a message queue or similar structure as described in FIG. 1. Rather, scaling component receives alerts directly from the instances (204A-204C) or zone (202). Two mechanisms for transmitting these alerts are described below.

In one embodiment, each instance transmits an alert or alarm based on the distributed counter value implemented by the peer counters (206A-206C). As described above, by distributing the local count values, each instance can maintain a count of a given metric across all instances (204A-204C). Therefore, any instance (or multiple instances) can generate an alarm or alert if the distributed count value is above (or below) a pre-defined threshold. In some embodiments, the thresholds are defined within a configuration file of the peer counters (206A-206C) that are packaged within an instance image.

In the above embodiment, a single instance can detect and trigger an alarm, sending the alarm to the scaling component (208). In some scenarios, though, multiple instances can trigger an alarm since, theoretically, all instances should have the same distributed count value. In this scenario, the scaling component (208) can lock scaling for a back-off period after receiving the first alarm. Alternatively, the scaling component (208) can compare the alarm to a second alarm to determine if they describe the same alarm conditions. Alternatively, the scaling component (208) can compute the target number of instances in the zone (e.g., the number of current instances plus additional instances or less instances to destroy) and can sequentially check to ensure that the target number can be met by processing the alarm.

In an alternative embodiment, instances (204A-204C) do not transmit alarms. Rather, each instance (204A-204C) provides an interface to query the distributed count value. In some embodiments, the zone (202) itself can provide the interface, enabling a single interface for querying the distributed count value. In this embodiment, scaling component (208) can periodically query the zone (202) or instances (204A-204C) to retrieve the most recent distributed count value. Note, that in some instances the time when the scaling component (208) queries the zone (202) or instances (204A-204C) can be synchronized, although this is not a requirement. In this embodiment, the complexity of scaling component (208) can be reduced since only a single distributed count value can retrieved at a time.

After receiving a distributed count value and determining whether the scale policy (210) dictates the creation/deletion of instances, the scaling component (208) issues commands to image management infrastructure ("IMI") (212). In one embodiment, the IMI (212) is shared by the platform (200) among various systems implemented on the client. In one embodiment, the IMI (212) comprises a set of devices configured to retrieve an image (214) from an index of device images and instantiate the device from the image. Additionally, the IMI (212) can be configured to identify an active instance (204A-204C) and terminate, suspend, or destroy the instance based on the scale policy (210).

In one embodiment, the scale policy (210) maintains the details required to manipulate instances. For instance, the scale policy (210) can include a trigger and a trigger value (discussed above) as well as an identifier of an image (214) to instantiate in response to the trigger exceeding the trigger value. Conversely, the scale policy (210) can include a zone (202) identifier that indicates which zone instance should be terminated in, in response to an alarm.

In one embodiment, IMI (212) exposes an API for manipulating instances. Thus, the scale policy (210) can issue API commands such as InstantiateInstance(id) or TerminateInstanceInZone(zoneId) or similar types of API commands to the IMI (212). In one embodiment, the API is provided over a network and thus the API commands can be issued via network requests to the IMI (212). In alternative embodiments, the API can be provided by a dynamically linked library or other type of programmatic library.

Figure 3:
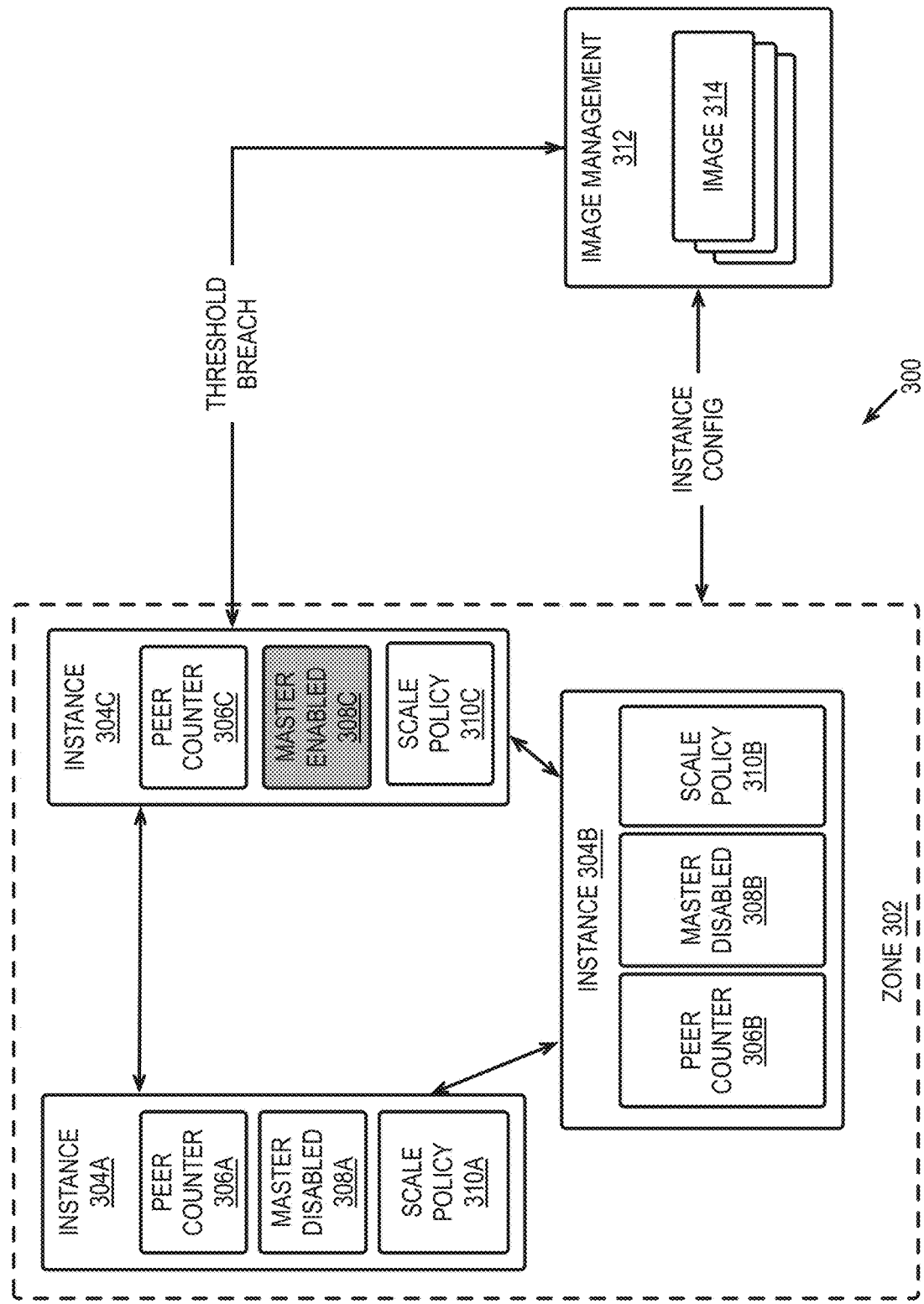
FIG. 3 is a block diagram illustrating a network platform providing decentralized auto-scaling according to some embodiments.

FIG. 3 is a block diagram illustrating a network platform providing decentralized auto-scaling according to some embodiments.

For ease of description, FIG. 3 illustrates a platform for providing network services and does not illustrate external devices such as network (104) and client devices (102A, 102B, 102C). Certainly, in some embodiments, platform (300) receives requests from client devices via a network in the manner discussed in connection with FIG. 1, the description of which is incorporated by reference in its entirety. As a preliminary matter, the operation of IMI (312) via images (314) operates identically to that described in FIG. 2 and the descriptions of the IMI and images with respect to FIG. 2 is incorporated herein by reference in its entirety. Similarly, zone (302) functions similarly to zone (202) in FIG. 2 and the disclosure related to zone (202) is incorporated herein by reference in its entirety.

As illustrated, a zone (302) includes a plurality of instances (304A-304C). Each instance (304A, 304B, 304C), includes a respective peer counter (306A, 306B, 306C). The operations performed by the local instances (304A-304C) and peer counters (306A-306C) are similar to an include those operations described in connection with FIG. 2, the disclosure of which is incorporated herein by reference in their entirety.

In FIG. 3, each instance (304A-304C) is equipped with a flag (308A-308C) indicating whether the specific instance is a master node. As indicated, the flags (308A-308C) indicate whether an instance (304A, 304B) is not the master (308A, 308B) or whether an instance (304C) is the master (308C). The choice of which instance is the master instance can vary as a function of, at least, time. Thus, the instance flagged as the master can change periodically.

Various techniques can be used to determine which instance is the master instance. In one embodiment, the selection of a master instance is fixed. In this embodiment, a single instance is flagged as master. If that instance is destroyed, a different instance is selected as the master instance. While this method provides the simplest selection of a master instance, it can not be ideal when instances are scaled.

In another embodiment, the master instance is selected in a round-robin fashion. In one embodiment, each instance is associated with an instance identifier when instantiated, and the instances can be ordered according to this instance identifier. Using round-robin scheduling, the instance currently marked as master notifies the subsequently ordered instance to become the master instance. This process repeats for all instances in the ordered listing of instances and loops to the beginning of the last upon reaching the last-ordered instance.

In another embodiment, a probabilistic model is used to determine when an instance is a master. In this embodiment, each instance makes its own determination on whether it should be the master node. In some embodiments, the instances are aware of the total number of instances in the zone and the last time in which the instance was identified as master. In some embodiments, the instance can additionally record an indication of whether commands issued as master successful. Using these data points, each instance can calculate an interval to wait before setting itself as master. In this scenario, each instance sets itself as master with a probability that the identification of master was, indeed, correct. As indicated above, the instance can refine this selection based on a determination of whether commands issued as master were successful. Commands issued by instances are discussed in more detail below.

In another embodiment, the instances can use an election periodic timer. In this embodiment, one instance is set as the master. If the master instance fails (e.g., is terminated, quits unexpectedly), the remaining instances employ an election mechanism to determine which instance should become the master. In one embodiment, each remaining instance enters a wait state after detecting a master failure and then sets an election decay timer. If the timer expires, the instance sets itself as master and transmits a message to the remaining instances that it is the master. Alternatively, if the instance (while awaiting the timer to expire) receives a message from another instance indicating it has set itself as master, the instance recognizes the other server as a master. In some embodiments, the decay timers can be set dynamically for each instance and each instance is not required to have the same length of decay timer.

As illustrated in FIG. 3, each instance (304A-304C) includes a copy of a scale policy (310A-310C). In one embodiment, the scale policies (310A-310C) comprise identical policies. In one embodiment, the scale policies (310A-310C) can be persistently stored on each instance (304A-304C). In an alternative embodiment, a single scale policy can be shared among the instances (304A-304C). In this embodiment, the scale policy can be transmitted among the instances as part of the master selection procedure. In general, the scale policies (310A-310C) are similar to the scale policies discussed previously and the description of those policies is incorporated herein by reference in its entirety.

As illustrated, the scaling component described in FIG. 2 is removed from the platform (300). As in FIG. 2, each instance (304A-304C) updates its peer counters to maintain a distributed count value for the zone (302). However, in FIG. 3, only a single instance is identified as master (e.g., 304C). Thus, only a single node has both the information required to scale (the distributed count value) and the authority to scale (the master enabled flag, 308C).

In the illustrated embodiment, the instance (304C) monitors the peer counter (306C) with reference to the scale policy (310C). This operation is similar to the previously described examples. However, FIG. 3 differs from FIG. 2 in that the instance itself is responsible for comparing the distributed count value to the alarm thresholds defined in the scale policy. If the master instance (304C) detects that the distributed count value exceeds a threshold in the scale policy (310C), the instance (304C) itself issues commands to modify the instances (304A-304C) in the zone (302). As described above, these commands are issued to IMI (312) and include operations such as creating or destroying instances.

The embodiments discussed in FIGS. 1-3 are cumulative in nature and various operations in one Figure can equally apply to others to the extent the inclusion does not contradict other aspects of the embodiments. In short, FIG. 1 illustrates a system relying on a central monitoring system and scaling component to auto-scale instances, while the instances in FIG. 1 perform no auto-scaling operations. In FIG. 2, the central monitoring system is removed and the instances are modified to implement a distributed counter which can be queried by the scaling component. In FIG. 3, the scaling component itself is further removed and the instances are further supplemented with functionality to perform both the monitoring of a distributed count value as well as instantiate or destroy instances (previously performed by the scaling component).

Furthermore, while the overall functionality implemented by the above software and hardware components is described above, reference is made to the following descriptions of the illustrated methods for a more detailed discussion of specific steps performed by the above systems.

Figure 4:
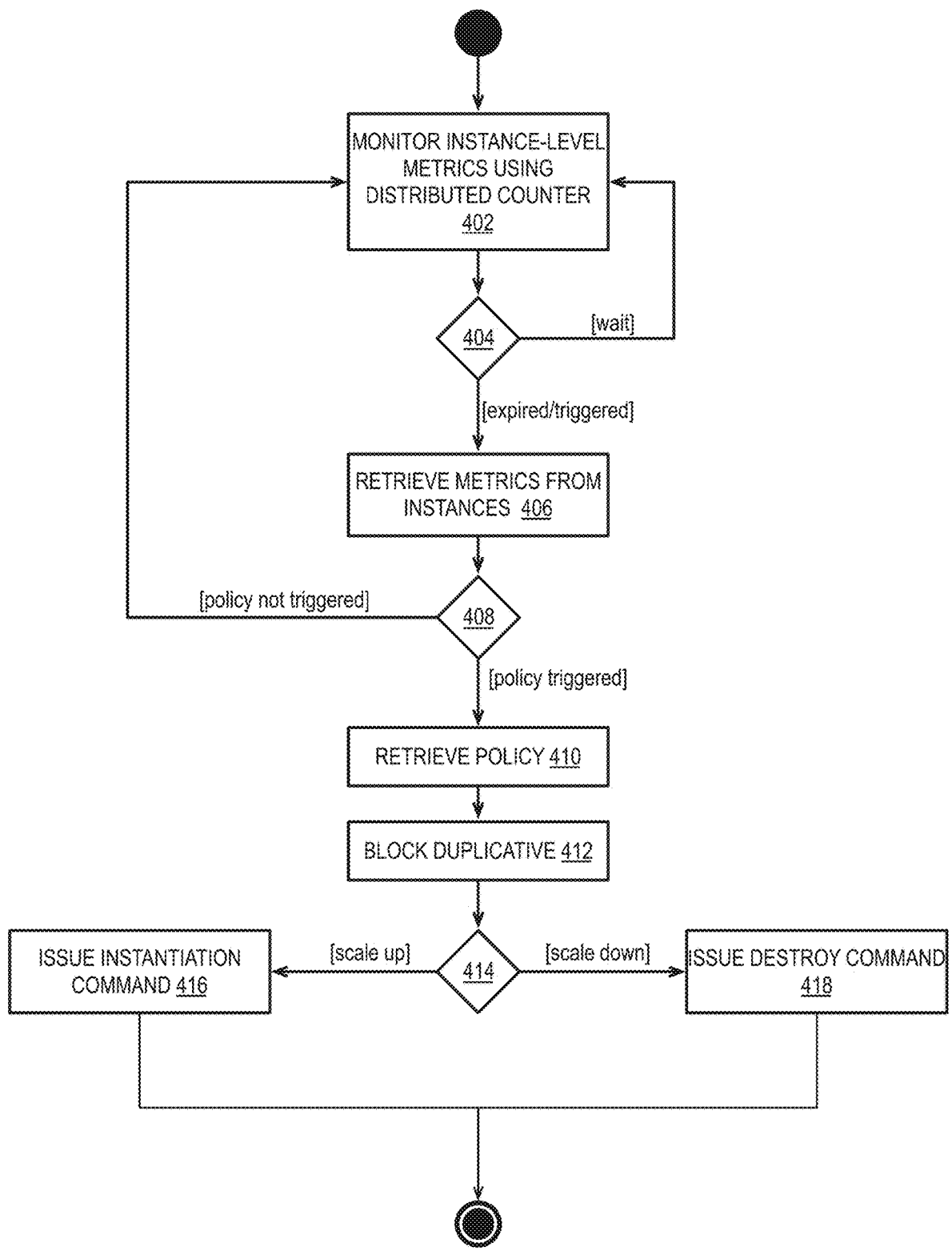
FIG. 4 is a flow diagram illustrating a method for auto-scaling network instances according to some embodiments of the disclosure.

FIG. 4 is a flow diagram illustrating a method for auto-scaling network instances according to some embodiments of the disclosure.

In step 402, the method monitors instance-level metrics using a distributed counter. In one embodiment, rather than relying on a centralized monitoring system to record and monitor instance-level metrics, the instances themselves report metrics and distributed the overall metrics of a cluster across all of the instances.

According to some embodiments, the instances receive requests from clients that cause an update to peer counter. For example, any inbound network request from a client would update a count of inbound network requests. As another example, a network request causing the CPU to perform an action would update a peer counter monitoring CPU usage.

As described above, the instance can be configured to provide a service to a number of clients. A number of peer counters can be updated, such that each counter's count (or count value) is updated (e.g., incremented, decremented, decayed, boosted, set or reset to a certain value, etc.). The peer counters can be updated in response to a request (or call) by a client. A message is communicated, by the instance, to a number of other instances (or peers) with which the instance shares a distributed count value, each one of the number of the peers is capable of maintaining its own peer counters corresponding to the client locally. The message comprises a command instructing each one of the number of peers to which the message is directed to update (e.g., increment, decrement, decay, boost, set (reset) to a certain value, etc.) its peer counter identified in the message.

The disclosed embodiments can use the distributed count value maintained using the peer counters to determine whether or not to modify the number of instances (as will be discussed in more detail). The determination can be made using a peer counter's counter value whose update includes applying a decay (or gain). By way of some non-limiting examples, the decay (or gain) can be based on an exponential decay over time or call count, linear decay (gain) over time or call count, explicit reset periodically, sliding window, sigmoid, or the like. A peer counter can have an associated upper limit (or threshold) value, such that if the count value of the peer counter reaches the upper limit it is not incremented further. Rather than incrementing the count value of a peer counter, the count value can be decremented (or incremented) with or without applying a gain (or decay) function to the count value. Such an inverse functionality can be used for token-based throttling, e.g., decrease token count per client. An instruction recipient (e.g., a peer) can further decay and/or boost the received count based on its state.

The disclosed embodiments can send the message, with an instruction to update the peer counters, to all of the peers sharing a distributed count value. Alternatively, the message can be sent to a subset of the peers. In the latter case, the message can include an instruction to increment the counter by an amount dependent on the number of peers included in the subset and the total number of peers sharing the distributed count value. By way of a non-limiting example, in a case that there are 1000 instances sharing a distributed count value and the message is to be sent to ten percent (or 100 peers) of the 1000 peers, the message can be communicated to the 100 peers with an instruction to each peer to increment its own peer counters by 10. By way of some non-limiting examples, the peers included in the peer subset can be selected randomly (e.g., any random, random unique set, random continuous range, etc.), round robin, or the like.

Peers sharing level of activity information can be predefined, automatically discovered (e.g., gossiping), or the like. Communication between peers can be multicasting, broadcasting, or the like.

In step 404, the method determines if either a trigger has occurred or if a timer has expired. If a trigger or timer is not implicated, the method continues to monitor instance-level metrics. Alternatively, if the trigger occurs or the timer expires the method retrieves metrics from the instances in step 406.

Since the method does not rely on a central monitoring system, the method either uses a trigger-based on a timer-based notification mechanism. In a timer-based mechanism, the instance-level metric(s) are retrieved on a regular schedule. For example, every 5 minutes, the instances can report the instance-level metrics. Alternatively, a trigger-based mechanism can be employed whereby each instance is configured to report the instance-level metric(s) upon the instance-level metric(s) meeting a pre-defined criteria or some other condition occurring.

In one embodiment, one or more of the instances push the instance-level metric(s) to a scaling component upon the trigger occurring or timer expiring. In another embodiment, the scaling component itself determines that the trigger has occurred or timer has expired and pulls the relevant instance-level metric(s) from one or more of the instances.

As an example, the instance-level metric can comprise inbound network requests. Each instance can be configured to raise an alarm (i.e., transmit the inbound network request instance-level metric) when the inbound network requests for the set of instances exceeds 100,000 for a given five-minute period. Alternatively, the instances can be configured to report the number of inbound network requests every five minutes. Two out of five instances can detect that the instance-level metric exceeds 100,000 (three other instances may not have updated the distributed count value) and each raise alarms and transmit the instance-level metric (e.g., 105,000 inbound network requests).

In one embodiment, the method can employ a blocking routine to ensure that duplicate instances are not created and more instances are destroyed than requested. Specifically, in the above scenario, the two instances can simultaneously issue alarms and transmit the instance level metric. An exemplary policy can be to instantiate one new instance for every 10,000 network requests above 100,000. Thus, the proper action in this scenario is to instantiate a new instance. However, from the point of view of the scaling component, a first alarm is raised indicating 105,000 network requests. Thus, the method would instantiate a new instance (discussed infra). However, the second alarm would then be received, causing the method to instantiate a second instance, for a total of two new instances for the same alarm reported by multiple instances.

In step 406, the method retrieves metrics from instances. In one embodiment, the method can receive these metrics from the instances over a network (i.e., they can be pushed to the method). In other embodiments, the method can pull the metrics from the instances. In one embodiment, each instance is registered within a zone and the metrics can be stored as properties of the instance. In this embodiment, the method can query the zone to retrieve the metrics from each instance via the properties exposed by the zone.

In step 408, the method checks to see if the policy is triggered or not. If it is not, the method returns to step 402. If the policy is triggered, the method continues to step 410 where a policy is retrieved for a given instance-level metric.

In one embodiment, a policy comprises one or more rules. A rule comprises an identification of an instance-level metric, a condition, and a directive. The condition comprises a threshold, range, or other comparable object as well as a condition regarding that object. The directive defines what should be done if the condition is met for the instance-level metric. For example, an example of an instance-level metric is CPU usage and a condition can comprise "greater than 70% utilization during a five-minute period." The directive in this case can be to instantiate a new instance.

In one embodiment, rules are indexed by the instance-level metric and the method retrieves one or more rules associated with the instance-level metric, using the instance-level metric as a key to the index. In some embodiments, multiple rules can exist for a single instance-level metric and the method can simulate the rules to synthesize a final rule. For example, if the rules for a received instance-level metric include directives that increase the instances by two and decrease the instances by one, the method synthesizes a new rule with a directive that increases the instances by one (the difference).

In step 412, the method blocks duplicative policies triggered by alarms.

To protect against this condition, the method can employ a blocking routine to prevent multiple instance operations. In one embodiment, the method can use a decay function to temporarily block new alarms. In another embodiment, the method can generate a unique ID for the alarm that describes the alarm. For example, the alarm can include a code or identifier based on the metric recorded, the time, and other aspect that can be used to correlate alarms. In this embodiment, the method can begin processing a first-received alarm. Subsequent alarms can then be compared to alarms already handled and duplicative alarms can be ignored. Similarly, in one embodiment, the scaling component can generate a unique ID for each alarm based on the state of the zone. For example, if an alarm triggers an increase in the number of instances, the scaling component can record a current number of instances (e.g., five) and a target number of instances (e.g., six). When a second alarm is raised, before the first alarm is processed, the resulting current and target number of instances would conflict with the predicted number of instances raised by the first alarm. In this scenario, the method can then ignore the second alarm as duplicative (i.e., a second attempt to raise the number of instances from five to six).

In step 414, the method determines whether a directive increases the numbers of instances or decreases the number of instances. In some embodiments, the method can support other operations such as modifying an instance (e.g., reducing CPU or RAM capacity, releasing resources, etc.).

If the directive increases the number of instances, the method issues an instantiation command in step 416. In one embodiment, issuing an instantiation command comprises transmitting a request to create a new instance of an image to an image management system. In some embodiments, the request can comprise an API request or other programmatic call to a system managed by a cloud platform. In one embodiment, the request can include the identity of an image which itself can be retrieved from the zone or individual instances. In one embodiment, instantiating an image comprises creating a clone of the existing instances and thus the same image used to instantiate the existing images can be used.

Alternatively, the policy can indicate that instances be destroyed. If the method detects that the policy includes a directive to destroy an instance in step 414, the method issues a command to destroy an instance in step 418. As in step 416, issuing a destroy command comprises transmitting a request to destroy an existing instance of an image to an image management system. In some embodiments, the request can comprise an API request or other programmatic call to a system managed by a cloud platform. In one embodiment, the request can include the identity of a running instance which itself can be retrieved from the zone or individual instances. In another embodiment, the destroy command does not include an identifier of an instance and the image management system can select which instance to destroy (e.g., randomly, according to a first created first destroyed policy or other policy).

Although not illustrated, other commands are possible. For example, the scale policy can indicate that the resources assigned to each instance can be adjusted based on a detected alarm. For example, if the RAM utilization of an instance exceeds 75%, the RAM can be increased dynamically for all instances (or for a single instance).

Figure 5:
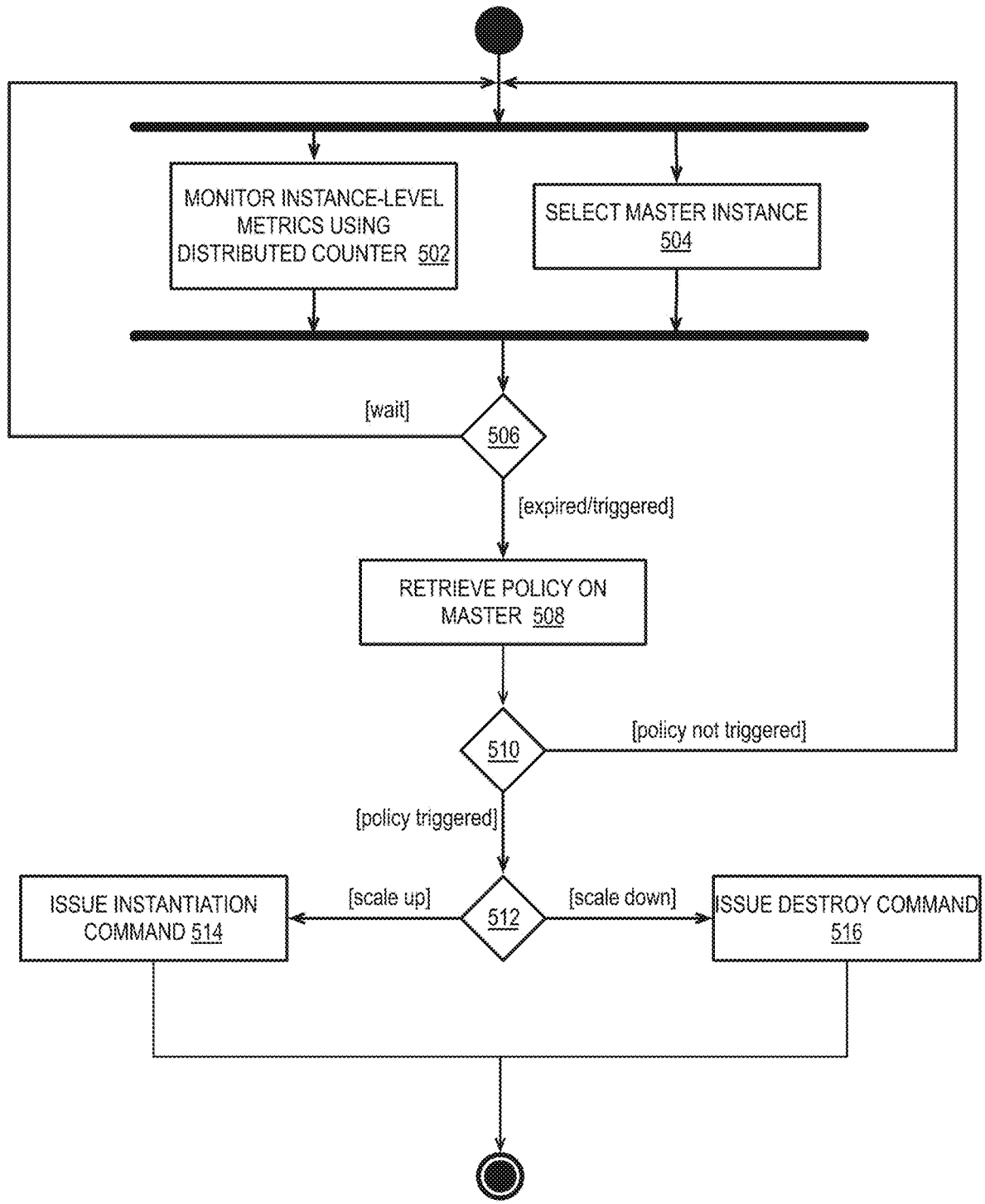
FIG. 5 is a flow diagram illustrating a method for auto-scaling network instances according to some embodiments of the disclosure.

FIG. 5 is a flow diagram illustrating a method for auto-scaling network instances according to some embodiments of the disclosure.

In the illustrated embodiment, steps 502 and 504 are performed in parallel during the operation of one or more instances. In step 502, the method monitors instance-level metrics using a distributed counter. In the illustrated embodiment, step 502 is performed identically to that performed in step 402 and the disclosure of step 402 is incorporated herein by reference in its entirety.

In step 504, the method selects a master instance.

Various techniques can be used to determine which instance is the master instance. In one embodiment, the selection of a master instance is fixed. In this embodiment, a single instance is flagged as master. If that instance is destroyed, a different instance is selected as the master instance. While this method provides the simplest selection of a master instance, it may not be ideal when instances are scaled.

In another embodiment, the master instance is selected in a round robin fashion. In one embodiment, each instance is associated with an instance identifier when instantiated, and the instances can be ordered according to this instance identifier. Using round robin scheduling, the instance currently marked as master notifies the subsequently ordered instance to become the master instance. This process repeats for all instances in the ordered listing of instances and loops to the beginning of the last upon reaching the last-ordered instance.

In another embodiment, a probabilistic model is used to determine when an instance is a master. In this embodiment, each instance makes its own determine on whether it should be the master node. In some embodiments, the instances are aware of the total number of instances in the zone and the last time in which the instance was identified as master. In some embodiments, the instance can additionally record an indication of whether commands issued as master successful. Using these data points, each instance can calculate an interval to wait prior to setting itself as master. In this scenario, each instance sets itself as master with a probability that the identification of master was, indeed, correct. As indicated above, the instance can refine this selection based on a determination of whether commands issued as master were successful. Commands issued by instances are discussed in more detail below.

In another embodiment, the instances can use an election periodic timer. In this embodiment, one instance is set as the master. If the master instance fails (e.g., is terminated, quits unexpectedly), the remaining instances employ an election mechanism to determine which instance should become the master. In one embodiment, each remaining instance enters a wait state after detecting a master failure and then sets an election decay timer. If the timer expires, the instance sets itself as master and transmits a message to the remaining instances that it is the master. Alternatively, if the instance (while awaiting the timer to expire) receives a message from another instance indicating it has set itself as master, the instance recognizes the other server as a master. In some embodiments, the decay timer can be set dynamically for each instance and each instance is not required to have the same length of decay timer.

In step 506, the method determines if either a trigger has occurred or if a timer has expired. If a trigger or timer is not implicated, the method continues to monitor instance-level metrics. Alternatively, if the trigger occurs or the timer expires the method retrieves metrics from the instances in step 406.

Since the method does not rely on a central monitoring system, the method either uses a trigger-based on a timer-based notification mechanism. In a timer-based mechanism, the instance-level metric(s) are retrieved on a regular schedule. For example, every 5 minutes, the instances can report the instance-level metrics. Alternatively, a trigger-based mechanism can be employed whereby each instance is configured to report the instance-level metric(s) upon the instance-level metric(s) meeting a pre-defined criteria or some other condition occurring.

In one embodiment, one or more of the instances push the instance-level metric(s) to a scaling component upon the trigger occurring or timer expiring. In another embodiment, the scaling component itself determines that the trigger has occurred or timer has expired and pulls the relevant instance-level metric(s) from one or more of the instances.

As an example, the instance-level metric can comprise inbound network requests. Each instance can be configured to raise an alarm (i.e., transmit the inbound network request instance-level metric) when the inbound network requests for the set of instances exceeds 100,000 for a given five-minute period. Alternatively, the instances can be configured to report the number of inbound network requests every five minutes. Two out of five instances can detect that the instance-level metric exceeds 100,000 (three other instances may not have updated the distributed count value) and each raise alarms and transmit the instance-level metric (e.g., 105,000 inbound network requests).

In step 508, the method retrieves the policy on the master instance. In contrast to FIG. 4, the master instance itself retrieves the policy from local memory since all instances are equipped with a copy of the policy. Details of a scaling policy are provided elsewhere and are incorporated herein by reference in their entirety.

In step 510, the method checks to see if the policy is triggered or not. If it is not, the method returns to steps 502 and 504. If the policy is triggered, the method continues to step 512.

In one embodiment, a policy comprises one or more rules. A rule comprises an identification of an instance-level metric, a condition, and a directive. The condition comprises a threshold, range, or other comparable object as well as a condition regarding that object. The directive defines what should be done if the condition is met for the instance-level metric. For example, an example of an instance-level metric is CPU usage and a condition can comprise "greater than 70% utilization during a five-minute period." The directive in this case can be to instantiate a new instance.

In one embodiment, rules are indexed by the instance-level metric and the method retrieves one or more rules associated with the instance-level metric, using the instance-level metric as a key to the index. In some embodiments, multiple rules can exist for a single instance-level metric and the method can simulate the rules to synthesize a final rule. For example, if the rules for a received instance-level metric include directives that increase the instances by two and decrease the instances by one, the method synthesize a new rule with a directive that increases the instances by one (the difference).

In step 512, the method determines whether a directive increases the numbers of instances or decreases the number of instances. In some embodiments, the method can support other operations such as modifying an instance (e.g., reducing CPU or RAM capacity, releasing resources, etc.).

If the directive increases the number of instances, the method issues an instantiation command in step 514. In one embodiment, issuing an instantiation command comprises transmitting a request to create a new instance of an image to an image management system. In some embodiments, the request can comprise an API request or other programmatic call to a system managed by a cloud platform. In one embodiment, the request can include the identity of an image which itself can be retrieved from the zone or individual instances. In one embodiment, instantiating an image comprises creating a clone of the existing instances and thus the same image used to instantiate the existing images can be used.

Alternatively, the policy can indicate that instances be destroyed. If the method detects that the policy includes a directive to destroy an instance in step 512, the method issues a command to destroy an instance in step 516. As in step 514, issuing a destroy command comprises transmitting a request to destroy an existing instance of an image to an image management system. In some embodiments, the request can comprise an API request or other programmatic call to a system managed by a cloud platform. In one embodiment, the request can include the identity of a running instance which itself can be retrieved from the zone or individual instances. In another embodiment, the destroy command can not include an identifier of an instance and the image management system can select which instance to destroy (e.g., randomly, according to a first created first destroyed policy or other policy).

Although not illustrated other commands are possible. For example, the scale policy can indicate that the resources assigned to each instance can be adjusted based on a detected alarm. For example, if the RAM utilization of an instance exceeds 75%, the RAM can be increased dynamically for all instances (or for a single instance).

Figure 6:
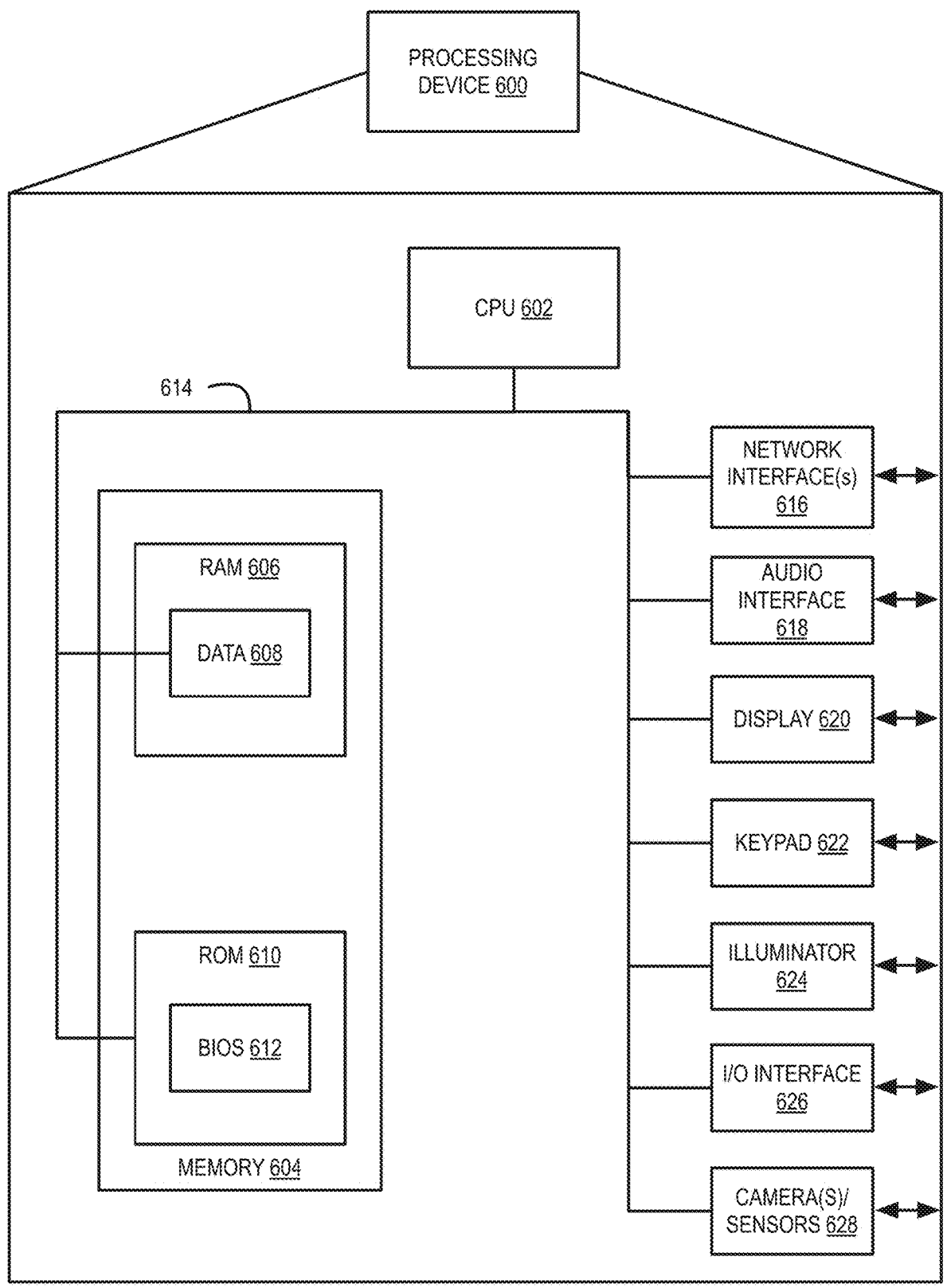
FIG. 6 is a block diagram illustrating a processing device for implementing auto-scaling according to some embodiments of the disclosure.

FIG. 6 is a block diagram illustrating a processing device for implementing auto-scaling according to some embodiments of the disclosure.

Processing device can include many more or fewer components than those shown in FIG. 6. For example, the aforementioned instances may not require an audio interface, display, keypad, illuminator, or cameras/sensors. However, the components shown are sufficient to disclose an illustrative embodiment for implementing the present disclosure. Further, in some embodiments, the device illustrated in FIG. 6 can be implemented as a virtual machine while in other embodiments the device can be implemented as a physical machine. In some embodiments, the device is implemented as both, with a virtual machine running on the device depicted in FIG. 6.

As shown in FIG. 6, processing device (600) includes processing units (CPUs) (602) in communication with a mass memory (604) via a bus (614). Processing device (600) also includes one or more network interfaces (616), an audio interface (618), a display (620), a keypad (622), an illuminator (624), an input/output interface (626), and a camera(s) or other optical, thermal or electromagnetic sensors (628). Processing device (600) can include one camera/sensor (628), or a plurality of cameras/sensors (628), as understood by those of skill in the art.

Processing device (600) can optionally communicate with a base station (not shown), or directly with another computing device. Network interface (616) includes circuitry for coupling processing device (600) to one or more networks and is constructed for use with one or more communication protocols and technologies. Network interface (616) is sometimes known as a transceiver, transceiving device, or network interface card (NIC).

Audio interface (618) is arranged to produce and receive audio signals such as the sound of a human voice. For example, audio interface (618) can be coupled to a speaker and microphone (not shown) to enable telecommunication with others and generate an audio acknowledgment for some action. Display (620) can be a liquid crystal display (LCD), gas plasma, light emitting diode (LED), or any other type of display used with a computing device. Display (620) can also include a touch sensitive screen arranged to receive input from an object such as a stylus or a digit from a human hand.

Keypad (622) can comprise any input device arranged to receive input from a user. For example, keypad (622) can include a push button numeric dial, or a keyboard. Keypad (622) can also include command buttons that are associated with selecting and sending images. Illuminator (624) can provide a status indication and provide light. Illuminator (624) can remain active for specific periods of time or in response to events. For example, when illuminator (624) is active, it can backlight the buttons on keypad (622) and stay on while the processing device (600) is powered. Also, illuminator (624) can backlight these buttons in various patterns when actions are performed, such as dialing another processing device. Illuminator (624) can also cause light sources positioned within a transparent or translucent case of the processing device (600) to illuminate in response to actions.

Processing device (600) also comprises input/output interface (626) for communicating with external devices not shown in FIG. 6. Input/output interface (626) can utilize one or more communication technologies, such as USB, infrared, Bluetooth™, or the like.

Mass memory (604) includes a RAM (606), a ROM (610), and other storage means. Mass memory (604) illustrates another example of computer storage media for storage of information such as computer-readable instructions, data structures, program modules or other data. Mass memory (604) stores a basic input/output system ("BIOS") (612) for controlling low-level operation of processing device (600). The mass memory can also store an operating system for controlling the operation of processing device (600). It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and operating system operations via Java application programs.

Memory (604) includes data (608). As described above, the data (608) can comprise a storage location for a distributed and peer counter. The data (608) can also include program code for performing the methods described in connection with FIGS. 2 through 5.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a non-transitory computer readable medium (or computer-readable storage medium/media) stores computer data, which data can include computer program code (or computer-executable instructions) that is executable in machine readable form. By way of non-limiting example a computer readable medium can comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more computing devices, client devices, servers, or be loaded and executed by one or more of such devices. One or more modules can be grouped into an engine or an application.

Those skilled in the art will recognize that the disclosed methods and systems can be implemented in many manners and are not limited by the foregoing exemplary embodiments and examples. Functional elements being performed by single or multiple components, in various combinations of hardware and software or firmware, and individual functions, can be distributed at the client, server or cloud level, or at all levels. In this regard, any of the features described herein can be combined into single or multiple embodiments, and alternate embodiments having fewer than, or more than, all of the features described herein are possible.

The embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Functionality can also be, in whole or in part, distributed among multiple components, in manners now known or to become known. Thus, myriad software/hardware/firmware combinations are possible in achieving the functions, features, interfaces and preferences described herein. The scope of the present disclosure covers known manners for carrying out the described unconventional features and functions and interfaces, as well as those variations and modifications that can be made to the hardware or software or firmware components described herein as would be understood by those skilled in the art now and hereafter. Thus, while various embodiments have been described for purposes of this disclosure, such embodiments should not be deemed to limit the teaching of this disclosure to those embodiments. Various changes and modifications can be made to the elements and operations described herein to obtain a result that remains within the scope of the systems and processes described in this disclosure.

What is claimed is:

1. A device comprising:
   a processor;
   a memory storing a scaling policy and a master enabled flag, the scaling policy and master enabled flag initialized in the memory during an instantiation of a virtual machine image, the master enabled flag indicating a master status when in a set state; and
   a storage medium for tangibly storing thereon program logic for execution by the processor, the stored program logic comprising:
      logic, executed by the processor, for executing the virtual machine image,
      logic, executed by the processor, for transmitting a first count value to one or more instances, the one or more instances executing respective distributed counters,
      logic, executed by the processor, for receiving a second count value from the one or more instances,
      logic, executed by the processor, for updating, using a distributed counter, a metric associated with the one or more instances based on the second count value,
      logic, executed by the processor, for identifying that the metric has exceeded a threshold defined within the scaling policy,
      logic, executed by the processor, for identifying a command to execute in response to the metric exceeding the threshold,
      logic, executed by the processor, for executing the command to modify the one or more instances, and
      logic, executed by the processor, for updating the master enabled flag, the updating disabling execution of the scaling.

2. The device of claim 1 the logic for executing the command to modify the one or more instances comprising logic, executed by the processor, for executing a command selected from the group consisting of instantiating a new instance, destroying one of the one or more instances, and modifying one of the one or more instances.

3. The device of claim 1, the stored program logic further comprising logic, executed by the processor, for setting the master enabled flag, the setting of the master enabled flag signaling that the device is a master instance.

4. The device of claim 3, the logic for setting the master enabled flag performed using a selection algorithm selected from the group consisting of a fixed selection, round robin algorithm, probabilistic selection, or election periodic timer algorithm.

5. The device of claim 3, the identifying a command to execute in response to the metric exceeding the threshold comprising issuing the command from the master instance to an image management infrastructure component.

6. The device of claim 1, the logic for updating a metric associated with one or more instances executing a network application comprising:
    logic, executed by the processor, for performing an operation;
    logic, executed by the processor, for updating a local counter corresponding to the metric; and
    logic, executed by the processor, for sending a message to at least one other instance, the message causing the at least one other instance to update a distributed count value.

7. A system comprising:
    one or more instances executing a network application, the one or more instances configured to:
    update, using a distributed counter stored locally by each of the one or more instances, a metric associated with each of the one or more instances, each of the one or more instances associated with a master enabled flag; and
    determine, based on master enabled flag associated with the one or more instances, a master instance as a scaling component, the scaling component configured to:
        identify that the metric has exceeded a threshold defined in a scaling policy based on comparing the distributed counter to the scaling policy,
        identify a command to execute in response to the metric exceeding the threshold,
        execute the command to modify the one or more instances, and
        update the master enabled flag, the updating disabling execution of the scaling policy.

8. The system of claim 7, the scaling component further configured to pull the metric from the one or more instances.

9. The system of claim 8, the scaling component further configured to retrieve the scaling policy stored locally on the scaling component and identifying a threshold in the scaling policy.

10. The system of claim 8 the scaling component further configured to execute a command selected from the group consisting of instantiating a new instance, destroying one of the one or more instances, and modifying one of the one or more instances.

11. The system of claim 8, the one or more instances further configured to:
    perform, by a selected instance from the one or more instances, an operation;
    update, by the selected instance, a local counter corresponding to the metric; and
    send, by the selected instance, a message to at least one other instance, the message causing the at least one other instance to update a distributed count value.

12. A method comprising:
    receiving, by one or more instances executing a network application, requests from a client device;
    updating, using distributed counters implemented by the one or more instances and stored locally by each of the one or more instances, a metric associated with each of the one or more instances based on the requests;
    determining, based on master enable flag associated with the one or more instances, a master instance for the one or more instances;
    identifying, by the master instance, that the metric has exceeded a threshold defined in a scaling policy based on comparing the distributed counter to the scaling policy;
    identifying, by the master instance, a command to execute in response to the metric exceeding the threshold;
    executing, by the master instance, the command to modify the one or more instances; and
    updating, by the master instance, the master enabled flag, the updating disabling
    execution of the scaling policy.

13. The method of claim 12, the executing the command to modify the one or more instances comprising executing a command selected from the group consisting of instantiating a new instance, destroying one of the one or more instances, and modifying one of the one or more instances.

14. The method of claim 12, the updating a metric associated with one or more instances executing a network application comprising:
    performing, by a selected instance from the one or more instances, an operation;
    updating, by the selected instance, a local counter corresponding to the metric; and
    sending, by the selected instance, a message to at least one other instance, the message causing the at least one other instance to update a distributed count value.

15. The method of claim 12, further comprising periodically selecting a master instance from the one or more instances.

16. The method of claim 15, the periodically selecting a master instance from the one or more instances performed using a selection algorithm selected from the group consisting of a fixed selection, round robin algorithm, probabilistic selection algorithm, or election periodic timer algorithm.

17. The method of claim 15, the identifying that the metric has exceeded a threshold defined in a scaling policy comprising retrieving, by the master instance, the scaling policy stored locally on the master instance and identifying a threshold in the scaling policy.

18. The method of claim 15, the identifying a command to execute in response to the metric exceeding the threshold comprising issuing the command from the master instance to an image management infrastructure component.

19. The method of claim 12, the identifying that the metric has exceeded a threshold defined in a scaling policy comprising pulling, by a scaling component, the metric from the one or more instances.

20. The method of claim 19, the identifying that the metric has exceeded a threshold defined in a scaling policy comprising retrieving, by the scaling component, the scaling policy stored locally on the scaling component and identifying a threshold in the scaling policy.

* * * * *